United States Patent [19]

Halpaap et al.

[11] Patent Number: 4,777,220

[45] Date of Patent: Oct. 11, 1988

[54] PROCESS FOR THE PRODUCTION OF PREPOLYMERS CONTAINING ISOCYANATE GROUPS, PREPOLYMERS PRODUCED BY THIS PROCESS AND THEIR USE

[75] Inventors: Reinhard Halpaap, Cologne; Manfred Bock, Leverkusen; Josef Pedain, Cologne; Gerhard Klein, Monheim; Dieter Arlt, Cologne, all of Fed. Rep. of Germany

[73] Assignee: Bayer Aktiengesellschaft, Leverkusen, Fed. Rep. of Germany

[21] Appl. No.: 151,866

[22] Filed: Feb. 3, 1988

[30] Foreign Application Priority Data

Feb. 10, 1987 [DE] Fed. Rep. of Germany ....... 3703973

[51] Int. Cl.⁴ .............................................. C08G 18/75
[52] U.S. Cl. ................................... 525/330.5; 528/59; 528/60; 528/61; 528/62; 528/64; 528/67; 528/81; 528/83
[58] Field of Search ................. 525/330.5; 528/59, 60, 528/61, 62, 64, 67, 81, 83

[56] References Cited

U.S. PATENT DOCUMENTS

| | | | |
|---|---|---|---|
| 3,706,710 | 12/1972 | Camilleri et al. | 260/75 |
| 4,184,005 | 1/1980 | Bauriedel et al. | 428/420 |
| 4,195,009 | 3/1980 | Zimmermann | 260/31.2 |
| 4,211,804 | 7/1980 | Brizzolara | 427/377 |
| 4,273,912 | 6/1981 | Harmer | 528/67 |
| 4,282,123 | 8/1981 | Ilaria | 260/18 |
| 4,292,350 | 9/1981 | Kubitza et al. | 427/385.5 |
| 4,385,171 | 5/1983 | Schnabel et al. | 528/491 |
| 4,413,111 | 11/1983 | Markusch et al. | 528/59 |
| 4,487,910 | 12/1984 | Bauriedel | 528/65 |
| 4,613,685 | 9/1986 | Klein et al. | 560/330 |
| 4,623,709 | 11/1986 | Bauriedel | 528/65 |

FOREIGN PATENT DOCUMENTS

| | | |
|---|---|---|
| 155323 | 6/1982 | Fed. Rep. of Germany . |
| 3608354 | 9/1987 | Fed. Rep. of Germany . |
| 3620821 | 12/1987 | Fed. Rep. of Germany . |
| 1101410 | 1/1968 | United Kingdom . |

Primary Examiner—Maurice J. Welsh
Attorney, Agent, or Firm—Gene Harsh; Joseph C. Gil; Thomas W. Roy

[57] ABSTRACT

The present invention is directed to a process for the production of prepolymers containing free tertiary isocyanate groups by reacting
(a) an organic diisocyanate containing one isocyanate group attached to a primary aliphatic carbon atom and an isocyanate group attached to a tertiary aliphatic or cycloaliphatic carbon atom with
(b) a polyester polyol having a molecular weight of 800 to 12,000 and a hydroxyl functionality of 2 to 6 at an NCO/OH equivalent ratio of 1.6:1 to 2:1 to provide prepolymers having a molecular weight of about 1000 to 3000 and an NCO content of about 4 to 12%.

The present invention is also directed to the prepolymers containing free isocyanate groups obtained by this process and to their use for the production of polyurethane lacquers and coatings.

16 Claims, No Drawings

PROCESS FOR THE PRODUCTION OF PREPOLYMERS CONTAINING ISOCYANATE GROUPS, PREPOLYMERS PRODUCED BY THIS PROCESS AND THEIR USE

BACKGROUND OF THE INVENTION

1. Field of the Invention

This invention relates to a new process for the production of NCO prepolymers based on selected starting materials having an NCO functionality of greater than 2.1 and a monomer content of less than 2% by weight, to the NCO prepolymers obtained by this process and to their use in polyurethane lacquers and coatings.

2. Description of the Prior Art

The production of isocyanate-terminated prepolymers is known and described, for example, in DE-OS Nos. 1,595,273, 2,845,514 and 3,401,129: in EP-A-No. 107,014 and EP-A-No. 118,065: and in U.S. Pat. Nos. 3,706,710, 4,184,005, 4,195,009, 4,211,804, 4,273,912, 4,282,123 and 4,385,171.

In many cases, it is a disadvantage that the prepolymers obtained have relatively high contents of monomeric diisocyanates. Prepolymers such as these are unsuitable for many applications because the high monomer contents make safe further processing by the user impossible for toxicological and industrial hygiene reasons. In addition, excessively high monomer contents frequently cause problems through the resulting excessive reactivities of the prepolymers with their reactants and, thus, overly short pot lives and processing times.

Accordingly, there have been no shortages of attempts to produce low-monomer isocyanate prepolymers and numerous processes have been developed to that end. Thus, on completion of the NCO/OH reaction, monomeric diisocyanates may be separated from the prepolymers by thin-layer distillation (for example DE-OS No. 1,595,273) or by stripping distillation using a relatively high-boiling auxiliary solvent (for example U.S. Pat. No. 4,385,171), providing the diisocyanates in question are volatile. In addition, the production of low-monomer prepolymers by heterogeneous reaction (DD-PS No. 155,323) or by a two-stage reaction using different diisocyanates (DE-OS No. 3,401,129, EP-A-No. 107,014, EP-A-No. 118,065) has already been described.

However, all the state-of-the-art processes mentioned above for the production of low-monomer isocyanate prepolymers are attended by the serious disadvantage that, in general, they involve either an elaborate multistage reaction technique or an additional step in the form of distillation on completion of the production process.

In addition, it has been found that certain isocyanate prepolymers required to show special properties cannot be produced by the processes mentioned above if, as a liquid or a melt, they cannot be freed from monomeric diisocyanates by thin-layer distillation, for example on account of their consistency. This group includes, for example, prepolymers based on aliphatic diisocyanates and branched polyester polyols which, accordingly, cannot be obtained in low-monomer form despite sufficiently high isocyanate contents.

Two-stage reactions frequently give prepolymers of relatively high molecular weight and, hence, relatively high viscosity. However, these prepolymers are not suitable for high-solid systems because these systems require low molecular weight isocyanate prepolymers which can be produced in concentrated, moderately viscous solutions despite their high isocyanate group content.

Accordingly, an object of the present invention is to provide a new process for the production of prepolymers containing free isocyanate groups which has the following advantages: The process is intended to enable low-monomer NCO prepolymers (content of free starting isocyanates less than 2 and preferably less than 1% by weight) to be produced in a single stage without subsequent removal of excess monomers. The NCO prepolymers are intended on the one hand to have a comparatively high NCO content (4 to 12% by weight) and an (average) NCO functionality of greater than 2.1, most preferably of at least 2.5 and, on the other hand, to contain incorporated, relatively high molecular weight polyester segments as elasticizing structural units, so that coatings produced from the prepolymers satisfy stringent practical requirements with regard to the mechanical properties of the lacquer coatings.

The object as stated above may be achieved by the provision of the process according to the invention which is described in detail hereinafter. In the process according to the invention, the starting diisocyanates used for the production of the prepolymers are organic diisocyanates containing an isocyanate group attached to a primary aliphatic carbon atom and an isocyanate group attached to a tertiary aliphatic or cycloaliphatic carbon atom in combination with selected polyhydroxyl compounds. Although it was known from DE-OS No. 3,402,623 (EP-A-No. 153,561 or U.S. Pat. No. 4,613,685, herein incorporated by reference in its entirety) that aliphatic-cycloaliphatic diisocyanates of this type are eminently suitable for the production of NCO prepolymers, it was not obvious from the disclosure of this publication that the object which the invention seeks to achieve, as stated above, could be achieved using diisocyanates of this type in combination with selected polyhydroxyl compounds of the type described in more detail hereinafter in certain quantitative ratios.

SUMMARY OF THE INVENTION

The present invention is directed to a process for the production of prepolymers containing free tertiary isocyanate groups by reacting (a) organic diisocyanates having a molecular weight of 168 to 320 and containing an isocyanate group attached to a primary aliphatic carbon atom and an isocyanate group attached to a tertiary aliphatic or cycloaliphatic carbon atom, optionally in admixture with up to 25 equivalent percent, based on component (a) as a whole, of diisocyanates containing aliphatically and/or cycloaliphatically bound isocyanate groups and having a molecular weight of 168 to 300 which do not contain any isocyanate groups attached to tertiary carbon atoms, with (b) a subequivalent quantity of a polyol component, characterized in that (i) at least one polyester polyol having a molecular weight of 800 to about 12,000 and a hydroxyl functionality of 2 to 6, optionally in admixture with at least one low molecular weight, polyhydric aliphatic alcohol having a molecular weight of 62 to 799, is used as the polyol component (b), the individual constituents of component (b) being so selected that the (average) hydroxyl functionality of component (b) is 2.1 to 3, (ii) the reactants are reacted in an NCO/OH equivalent ratio of 1.6:1 to 2:1 and (iii) the type of and quantitative ratios between the reactants are selected such that the (average) molecular weight of the prepolymers is about 1000 to 3000 and the NCO content of the prepolymers is about 4 to 12% by weight.

The present invention is also directed to the prepolymers containing free isocyanate groups obtained by this process.

The present invention is finally directed to the use of the prepolymers containing free isocyanate groups obtained by the process according to the invention, optionally blocked with blocking agents for isocyanate groups, as the isocyanate component for the production of polyurethane lacquers and coatings.

DETAILED DESCRIPTION OF THE INVENTION

Starting materials for the process according to the invention include (a) organic polyisocyanates of the type mentioned above under (a) and (b) organic polyhydroxyl compounds of the type mentioned above under (b).

Suitable diisocyanates (a) correspond for example to the following general formula

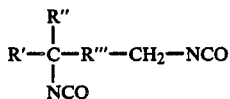

in which

R' and R", which may be the same or different, represent $C_1$-$C_4$ alkyl groups and R''' represents a difunctional, optionally branched, saturated aliphatic hydrocarbon radical containing from 2 to 9 carbon atoms.

Diisocyanates such as these and their production are described, for example, in German Patent Applications P No. 36 08 354.2 (=DE-OS No. 36 08 354) and P No. 36 20 821.3 (=DE-OS No. 36 20 821). Preferred diisocyanates of this type are those in which R' and R" are each methyl groups. Typical representatives are, for example, 1,4-diisocyanato-4-methyl-pentane, 1,5-diisocyanato-5-methylhexane, 1,6-diisocyanato-6-methyl-heptane, 1,5-diisocyanato-2,2,5-trimethylhexane or 1,7-diisocyanato-3,7-dimethyloctane.

However, preferred starting components (a) are aliphatic-cycloaliphatic diisocyanates corresponding to the following general formula

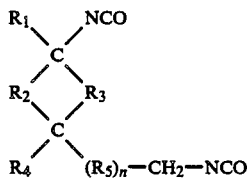

in which $R_1$ is a $C_1$-$C_4$ alkyl group, preferably a methyl group, $R_2$ and $R_3$, which may be the same or different, represent a difunctional linear or branched, saturated hydrocarbon radical containing from 1 to 4, preferably 1 to 3 carbon atoms, the sum of the carbon atoms in these radicals preferably being 3 to 6 and more preferably 4 or 5, $R_4$ is hydrogen or a $C_1$-$C_4$ alkyl group, preferably hydrogen or a methyl group, $R_5$ is a difunctional, linear or branched, saturated aliphatic hydrocarbon radical containing from 1 to 4, preferably 1 to 3 carbon atoms, and n=0 or 1

Aliphatic-cycloaliphatic diisocyanates of this type particularly preferred as starting component (a) include 1-isocyanato-1-methyl-4(3)-isocyanatomethylcyclohexane (which is generally present in the form of a mixture of the 4- and 3-isocyanatomethyl isomers), 1-isocyanato-1-methyl-4-(4-isocyanatobut-2-yl)-cyclohexane, 1-isocyanato-1,2,2-trimethyl-3-(2-isocyanatoethyl)-cyclopentane or 1-isocyanato-1,4(3)-dimethyl4(3)-isocyanatomethylcyclohexane (which is generally present in the form of a mixture of the 4-methyl-4-isocyanatomethyl and 3-methyl-3-isocyanatomethyl isomers). Other suitable aliphatic-cycloaliphatic diisocyanates include 1-isocyanato-1-n-butyl-3(4-isocyanatobut-1-yl)-cyclopentane, 1-isocyanato-1-ethyl-4-n-butyl-4-(4-isocyanatobut-1-yl)-cyclohexane or 1-isocyanato-1,2-dimethyl-3-ethyl-3-isocyanatomethylcyclopentane.

The production of these aliphatic-cycloaliphatic diisocyanates is described, for example, in EP-A-No. 0,153,561. Mixtures of the diisocyanates mentioned by way of example, which corresponds to the above general formulae, may of course also be used as component (a) in the process according to the invention. It is also possible, although less preferred, to use other diisocyanates known per se from polyurethane chemistry containing aliphatically and/or cycloaliphatically bound isocyanate groups and having a molecular weight of from 168 to 300, which do not contain any isocyanate groups attached to tertiary carbon atoms, such as hexamethylene diisocyanate, 1-isocyanato-3,3,5-trimethyl-5-isocyanatomethylcyclohexane and/or 4,4'-diisocyanatodicyclohexylmethane. Diisocyanates such as these may be used in quantities of up to about 25 equivalent percent, based on component (a) as a whole.

Component (b) has an (average) hydroxyl functionality of at least 2.1, preferably 2.4 to 3, and is based on either at least one polyester polyol having an (average) molecular weight of 800 to about 12,000, preferably 800 to about 4000 and more preferably about 1000 to 3000 or a mixture of at least one such polyester polyol with at least one low molecular weight, polyhydric aliphatic alcohol having a molecular weight of 62 to 799, preferably 62 to about 200.

An individual constituent of component (b) may have a hydroxyl functionality of less than 2.1, i.e. a hydroxyl functionality of 2. The only important requirement is that, where mixtures of different polyhydroxyl compounds are used, as is preferably the case, the average hydroxyl functionality of the mixture should be at least 2.1, preferably 2.4 to 3. In addition, the individual constituents of component (b) and the quantitative ratios between them are selected such that the NCO prepolymers obtained on completion of the reaction with component (a) should have an average molecular weight of about 1000 to 3000, preferably of about 1200 to 2500. This means that the average molecular weight of component (b) should be about 200 to 2600, preferably about 250 to 2200.

The "average functionality" of the mixture used as component (b) corresponds to the sum of the mole fractions of the individual components multiplied by the functionality of the individual components. The "average molecular weight" corresponds to the sum of the mole fractions of the individual components multiplied by the molecular weight of the individual components. Polyester polyols which, in turn, may represent mixtures as a result of their production enter these calculations as "individual components", the functionality of these "individual components"—in the case of the reaction products of polyhydric alcohols with polybasic carboxylic acids described by way of example hereinafter—being calculable from the type and quantity of the starting materials (polycarboxylic acids and polyols) used in their production in accordance with the following equation:

$$F_{OH} = \frac{\Sigma \text{equiv}_{OH} - \Sigma \text{equiv}_{COOH}}{\Sigma \text{mole}_{(OH+COOH)} - \Sigma \text{equiv}_{COOH}}$$

In this equation, "equiv" represents the number of gram equivalents of hydroxyl or carboxyl groups, while "mole" represents the number of moles of hydroxyl or carboxyl compounds. The (average) functionality of the "individual components" including the polycarbonate polyols and the polyhydroxyl polyacrylates, may be calculated from the (average) molecular weight and the hydroxyl group content.

The (average) molecular weight of the "individual components" may be calculated from their content of functional groups (particularly hydroxyl groups) and their functionality and, in addition, may also be determined by gel chromatography.

The average molecular weight of component (b) is within the limits mentioned above. However, this does not preclude individual components of the mixture optionally used as component (b) from having a molecular weight outside those limits.

Component (b) or the individual constituents thereof are preferably based on (b1) polyester polyols and, optionally as mixing component b2), low molecular weight aliphatic polyols optionally containing ether groups and having a molecular weight of 62 to 799 preferably 62 to about 200.

Suitable polyester polyols (b1) include those having molecular weights in the above mentioned range of 800 to about 12,000, preferably 800 to about 4000 and more preferably about 1000 to 3000. In the context of the invention, the "polyester polyols" are understood to be any organic polyhydroxyl compounds which contain ester groups. Accordingly, "polyester polyols" also include the polycarbonate polyols known per se from polyurethane chemistry and the polyhydroxy polyacrylates also known from polyurethane chemistry. The (average) molecular weight of the polycarbonate polyols suitable for use as component (b1) and the reaction products described hereinafter of polyhydric alcohols with subequivalent quantities of polybasic carboxylic acids is generally within the preferred limit of 800 to about 4000, more preferably about 1000 to 3000. However, when the known polyhydroxy polyacrylates are used as the "polyester polyols" (b1), their average molecular weight may also be above the upper limit of about 4000 just mentioned and may be as high as about 12,000. However, in either case the average molecular weight of component (b) lies within the above-mentioned limits of about 200 to 2600, preferably about 250 to 2200 and, if necessary, may be adjusted by admixture with low molecular weight polyols (b 2).

Suitable polyester polyols (b1) include the reaction products of polyhydric alcohols with subequivalent quantities of polybasic carboxylic acids. Instead of using the carboxylic acids, it is of course also possible to use the corresponding polycarboxylic acid anhydrides or polycarboxylic acid esters of lower alcohols or mixtures thereof for the production of the polyesters. The polycarboxylic acids may be aliphatic, cycloaliphatic, aromatic and/or heterocyclic and may optionally be substituted, for example by halogen atoms, and/or unsaturated. Examples of suitable polybasic carboxylic acids or carboxylic acid derivatives are succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, maleic acid, maleic acid anhydride, dimeric and trimeric fatty acids (such as oleic acid, optionally in admixture with monomeric fatty acids), terephthalic acid dimethyl ester and terephthalic acid-bis-glycol ester.

Suitable polyhydric alcohols include ethanediol, 1,2- and 1,3-propanediol, 1,3-. 2,3- and 1,4-butanediol, 1,6-hexanediol, 1,8-octanediol, neopentyl glycol, 1,4-bis-(hydroxymethyl)-cyclohexane, 2-methyl-1,3-propanediol, 2,2,4-trimethyl-1,3-pentanediol, 2-ethyl-1,3-hexanediol, glycerol, timethylolpropane and 1,2,6-hexanetriol.

The polyesters may contain terminal carboxyl groups. Polyesters of lactones, for example $\equiv$-caprolactone, or hydroxycarboxylic acids, for example $\omega$-hydroxycaproic acid, may also be used.

Suitable polycarbonate polyols which may be used include the known polycarbonate diols of the type obtainable from the diols mentioned by way of example above and subequivalent quantities of diphenylcarbonate.

Suitable polyhydroxy polyacrylates are the known, hydroxyl-containing copolymers of olefinically unsaturated compounds such as styrene, acrylonitrile, methylacrylate, ethylacrylate, butylacrylate, the corresponding methacrylic acid esters with hydroxylcontaining comonomers, such as hydroxyethylacrylate, 2-hydroxypropylacrylate, 3-hydroxypropylacrylate and the corresponding methacrylates.

Suitable low molecular weight polyhydroxyl compounds (b2) having molecular weights in the abovementioned range include the simple polyfunctional alkane polyols such as the low molecular weight polyols mentioned above in regard to the production of the polyester polyols. However, other suitable mixing components (b2) are low molecular weight polyester polyols of the starting materials mentioned by way of example above providing their molecular weight is below 800.

An equivalent ratio of isocyanate groups to hydroxyl groups of 1.6:1 to 2:1, preferably 1.8:1 to 2:1, is maintained in the production of the isocyanate prepolymers according to the invention from the starting diisocyanates (a) and the polyhydroxyl compounds (b). If, in addition to the diisocyanates (a) according to the invention containing isocyanate groups attached to primary/tertiary carbon atoms, diisocyanates without any isocyanate groups attached to tertiary carbon atoms are used in subequivalent quantities of up to about 25 equivalent percent, based on the total quantity of starting diisocyanates (a), the equivalent ratio of isocyanate groups to hydroxyl groups is subject to the limitation that within the above-mentioned range of the NCO/OH ratio, the ratio of isocyanate groups which are not bound to tertiary carbon atoms to OH groups NCO (non-tertiary)-/OH is ≦1.

In general, the starting components (a) and (b) are initially introduced together, homogeneously stirred and the reaction carried out at a temperature of about 20° to 200° C., preferably about 40° to 140° C. and more preferably about 40° to 100° C. The reaction is over when the NCO content reaches or falls just short of the theoretical NCO content calculated from the stoichiometry of the starting materials. The residual monomer content of free diisocyanates (a) is generally below 2% by weight, preferably below 1% by weight, depending on the starting materials used and the reaction conditions maintained. When diisocyanates (a) without any isocyanate groups attached to tertiary carbon atoms such as hexamethylene diisocyanate for example, have been used, the reaction products contain less than 0,1% by weight of these diisocyanates.

The production of the prepolymers according to the invention may be carried out either in the melt or, preferably, in inert solvents in order directly to obtain the ready-to-use lacquer components. The solvent is present in an amount of up to 30% by weight, preferably up to about 20%, based on solution. The prepolymers may of course also be dissolved with a relatively low solids content, although this is not preferred when they are used as components for high-solids lacquers.

Suitable inert solvents include ethylacetate, butylacetate, ethylene glycol monomethyl or monoethyl ether acetate, 1-methoxypropyl-2-acetate, 2-butanone, 4-methyl-2-pentanone, cyclohexanone, toluene, xylene, solvent naphtha or mixtures thereof. Other suitable solvents include plasticizers such as plasticizers based on phosphoric acid, sulfonic acid or phthalic acid esters.

Through a suitable choice of the starting compounds used for their production, the NCO prepolymers according to the invention also have an average NCO functionality of at least 2.1, preferably 2.1 to 4 and more preferably 2.5 to 3.0. Their average molecular weight, calculated from the stoichiometry of the starting materials, is generally about 1000 to 3000, more preferably about 1200 to 2500. The prepolymer solutions, which are preferably adjusted to solids concentrations of about 75 to 85%, preferably have an isocyanate group content of about 3.5 to 10%; their viscosity (as measured at 23° C.) is in the range of about 1000 to 100,000 mPas, depending on the solids content. The isocyanate prepolymers according to the invention are distinguished in particular by a greatly reduced monomer content which is below 2% by weight and preferably below 1% by weight.

The average NCO functionality of the end products of the process according to the invention may be calculated from the amounts of the starting materials used for their production in accordance with the following equation:

$$F_{NCO} = \frac{\Sigma \text{equiv}_{NCO} - \Sigma \text{equiv}_{OH}}{\Sigma \text{mole}_{(NCO+OH)} - \Sigma \text{equiv}_{OH}}$$

In this equation, "equiv$_{NCO}$" represents the number of gram equivalents of isocyanate groups in component (a), "equiv$_{OH}$" represents the number of gram equivalents of hydroxyl groups in component (b) and "mole$_{(NCO+OH)}$" represents the number of moles of polyisocyanates (a) and polyhydroxyl compounds (b). When mixtures (b) are used, the corresponding average values are introduced into the equation. In the less preferred case where component (b) contains small quantities of carboxyl groups in addition to hydroxyl groups, these carboxyl groups must of course also be taken into consideration as isocyanate-reactive groups. The same also applies to the above-mentioned equivalent ratio of isocyanate groups to hydroxyl groups, i.e. the expression "hydroxyl groups" in this connection is representative of all isocyanate-reactive groups. In general, however, the content of carboxyl groups in component (b) is negligible.

The end products of the process according to the invention are suitable for use as isocyanate components in polyurethane systems, more especially for the production of lacquers, coating compositions or sealing compounds and may be processed as one-component or two-component systems. When they are processed as one-component systems, the end products of the process according to the invention may also be blocked with blocking agents for isocyanate groups. Suitable blocking agents include malonic acid diethyl ester, ≡ caprolactam and butanone oxime.

In the preferred case where the end products of the process according to the invention are used as the isocyanate component in two-component systems, the NCO prepolymers are combined with isocyanate-reactive compounds. Suitable isocyanate-reactive compounds for this purpose include the polyhydroxyl compounds known per se in polyurethane chemistry which have already been described in the foregoing as synthesis component(b). In one preferred embodiment, combinations of the NCO prepolymers according to the invention with polyketimines based on polyamines containing aliphatically or cycloaliphatically bound primary amino groups and aliphatic or cycloaliphatic ketones are used as reactants. Polyketimines of this type are described, for example, in DE-AS No. 1,520,139 and DE-OS No. 3,308,418. Mixtures of the isocyanate-reactive compounds may of course also be used as reactants. The quantitative ratio between the components is generally gauged in such a way that the equivalent ratio of isocyanate groups in the prepolymers according to the invention to the sum of the isocyanate-reactive groups (including ketimine groups) is about 0.9:1 to 4:1, preferably about 1:1 to 2:1 and more preferably about 1:1 to 1.2:1.

In the production of corresponding combinations for use in accordance with the invention, inert organic solvents or plasticizers of the type already mentioned by way of example with regard to the production of the prepolymers may be added during the mixing of the NCO prepolymers according to the invention with the reactants mentioned. They should be substantially anhydrous to guarantee adequate stability of the mixtures in storage and, in addition, be used only in the quantities necessary to adjust the mixtures to an adequate processing viscosity. The mixtures are preferably adjusted to solids contents of at least about 50% by weight and preferably to solids contents of about 60 to 90% by weight. Providing the starting components are suitably selected, however, it is also possible in principle to use solvent-free, i.e, 100% combinations.

It is of course also possible to use the auxiliaries and additives normally used in lacquer technology such as pigments, fillers, levelling aids, catalysts and stabilizers.

For practical application, the NCO prepolymers according to the invention and their isocyanate-reactive reactants may both be sprayed as genuine two-component systems, for example using two-component spray applicators, or may be mixed to form corresponding lacquer combinations which have pot lives and processing times ranging from a few hours to several weeks, depending on the choice of the reactants. Within the available pot life, the coating compositions may be applied in one or more layers to any substrates by methods known per se, for example by spray coating, spread coating, dip coating, flood coating or by roll coating or knife coating.

The coatings may then be dried and baked at elevated temperature. However, in the preferred embodiment where polyketimines are used as reactants for the NCO prepolymers according to the invention, rapid drying is also possible at room temperature in the presence of atmospheric moisture. It is of course also possible to use the end products of the process according to the invention as the sole binder component in one-component systems which dry under the effect of atmospheric moisture.

The coating compositions according to the invention may be applied to any substrates, including metals, wood, glass, stone, ceramic materials, concrete, rigid and flexible plastics, fabrics, leather and paper. These substrates may optionally be primed before they are coated with the coating composition according to the invention.

This, then, is another field of application for the NCO prepolymers according to the invention. The properties of the lacquers obtained may be varied over a wide range both through suitable choice of the polyhydroxyl compounds (b), which are used in the production of the prepolymers, and also through the correct choice of the reactants for the NCO prepolymers according to the invention. It is thus possible to produce both rigid and also elastic coatings, depending on the application envisioned or on the substrate to be coated.

The invention is further illustrated but is not intended to be limited by the following examples in which all parts and percentages are by weight unless otherwise specified. The NCO/OH ratios are based on equivalent ratios.

EXAMPLES

Starting materials:

Diisocyanate I 1-isocyanato-1-methyl-4-(3)-isocyanatomethylcyclohexane (Example 1 of U.S. Pat. No. 4,613,685)

Diisocyanate II 1-isocyanto-1-methyl-4-(4-isocyanatobut-2-yl)-cyclohexane (Example 2 of U.S. Pat. No. 4,613,685)

Linear polyester I

Prepared from 523 parts adipic acid, 309 parts 1,6-hexanediol and 168 parts neopentyl glycol. Hydroxyl group content 2.0%, carboxyl group content <0.05%, average molecular weight 1700.

Linear polyester II

Prepared from adipic acid and 1,6-hexanediol:hydroxyl group content 4.0%, carboxyl group content <0.05%, average molecular weight 840.

Branched polyester III

Prepared from 334 parts isophthalic acid, 118 parts adipic acid, 60 parts phthalic acid anhydride, 380 parts 1,6-hexanediol and 108 parts trimethylolpropane. Hydroxyl functionality 3.0, carboxyl group content <0.05%, OH number 145.

Ketimine I

Ketimine of 3-aminomethyl-3,5,5-trimethylcyclohexylamine (isophoronediamine) and 4-methyl-2-pentanone (Example b2 of DE-OS No. 3,308,418).

Ketimine II

Ketimine of 3-aminomethyl-3,5,5-trimethylcyclohexylamine and butanone (Example b1of DE-OS No. 3,308,418).

Production of isocyanate prepolymers according to the invention

EXAMPLE 1

427 parts of the linear polyester I, 100 parts of the branched polyester III and 30 parts of 1,6-hexanediol were dissolved in 200 parts of butylacetate/xylene (1:1) and reacted with 243 parts of diisocyanate I for about 3 h at 60° C. (NCO/OH=2:1).

A clear solution having a solids content of 80%, an NCO content of 5.0% and a viscosity at 23° C. of 1700 mPas was obtained. The content of monomeric diisocyanate I was 0.7%. The polyisocyanate had an average NCO functionality of 2.1 and an average molecular weight of approx. 1400.

EXAMPLE 2

455 parts of the linear polyester I, 53 parts of the branched polyester III, 32 parts of 1,6-hexanediol and 210 parts of diisocyanate I were dissolved in 250 parts of butylacetate/xylene (1:1) and reacted for 3 h at 60° C. and for 1 h at 110° C. (NCO/OH ratio 1.8:1) to form a prepolymer. The 75% solution obtained had an NCO content of 3.8%, a viscosity at 23° C. of 900 mPas and a content of monomeric diisocyanate I of 0.6%. The average molecular weight of the prepolymer was 1750 for an average NCO functionality of 2.1.

EXAMPLE 3

A mixture of 515 parts of the linear polyester I and 41 parts of trimethylolpropane were dissolved in 150 parts of butylacetate/xylene (1:1) and reacted with 294 parts of diisocyanate I (NCO/OH =2:1). After a reaction time of 3 h at 60° C., an 85%, clear solution was obtained which had an isocyanate content of 5.9%, a viscosity at 23° C. of 4500 mPas and a content of monomeric diisocyanate I of 0.3%. A prepolymer having an average NCO functionality of 2.5 and an average molecular weight of approx. 1500 was obtained.

EXAMPLE 4

396 parts of diisocyanate I were reacted for 5 h at 60° C. with 408 parts of the branched polyester III and 46 parts of trimethylolpropane (NCO/OH =2:1) dissolved in 150 parts of butylacetate/xylene (1:1). The 85% solution of the prepolymer obtained had an NCO content of 8.4%, a viscosity at 23° C. of 14,000 mPas and a content of monomeric diisocyanate of 0.7%. The prepolymer had an average molecular weight of 1300 and an average NCO functionality of 3.

EXAMPLE 5

A mixture of 208 parts of polyester I, 104 parts of polyester II, 196 parts of polyester III and 36 parts of 2,2,4-trimethyl-1,3-pentanediol in 200 parts of butylacetate was reacted with 256 parts of diisocyanate I for 6 h at 60° C. until there was no further reduction in the NCO content (NCO/OH =1.8:1). A clear, 80% solution of the prepolymer was obtained which had an NCO content of 4.5%, a viscosity at 23° C. of 5600 mPas and a content of monomeric diisocyanate I of 0.4%. The prepolymer had an average NCO functionality of 2.3 and an average molecular weight of 1700.

EXAMPLE 6

A mixture of 400 parts of linear polyester I, 04 parts of branched polyester III, 31 parts of 1,6-hexanediol and 275 parts of diisocyanate II was reacted for about 1 h at 40° to 60° C. in 150 parts of butylacetate/xylene (1:1) in the presence of 200 ppm dibutyltin dilaurate as catalyst (NCO/OH =1.8:1). An 85%, clear solution of an isocyanate prepolymer having an NCO content of 4.2%, a viscosity at 23° C. of 4300 mPas and a content of monomeric diisocyanate II of 0.3% was obtained. The prepolymer had an average NCO functionality of 2.2 and an average molecular weight of 1850.

EXAMPLE 7

479 parts of linear polyester I and 38 parts of trimethylolpropane were reacted for 3 h at 60° C. with 333 parts of diisocyanate II (NCO/OH =2:1) in 150 parts of butylacetate/xylene (1:1). The 85%, clear solution obtained had a viscosity at 23° C. of 4800 mPas, a content of monomeric diisocyanate II of 0.8 and an NCO content of 5.2%. The prepolymer had an average molecular weight of approximately 1700 and an average NCO functionality of 2.5.

EXAMPLE 8

An 80% prepolymer solution having an NCO content of 6.5%, a viscosity at 23° C. of 7500 mPas and a content of monomeric diisocyanate II of 0.6% was prepared by reacting 349 parts of the branched polyester III, 39 parts of trimethylolpropane and 412 parts of diisocyanate II (NCO/OH =2:1) for about 5 h at 60° C. in 200 parts of butylacetate/xylene (1:1). T prepolymer had an average functionality of 3 and an average molecular weight of approximately 1600.

APPLICATION EXAMPLES

EXAMPLE 9

A ready-to-use lacquer was prepared from 725 parts of the 80% prepolymer prepared in accordance with Example 1, 120 parts of polyketimine II and 155 parts of butylacetate/xylene (1:1). The lacquer which had a pot life in a sealed container of approximately 10 days was applied in a thick layer (approx.600 μm) and dried in about 1.5 h at room temperature to form a highly elastic film of low hardness which was suitable as a chipresistant protective coating. The drying time of the lacquer can be considerably shortened by increasing the drying temperature.

EXAMPLE 10

A pigmented surface lacquer was prepared from 394 parts of the 85% prepolymer solution prepared in accordance with Example 4, 132 parts of the polyketimine I, 233 parts of a commercial titanium dioxide pigment and 241 parts of butylacetate/xylene (1:1). Whereas the pot life of the lacquer in a sealed container is more than 30 days, an approx. 40 μm thick film of the lacquer was sand-dry after 40 to 50 minutes at room temperature and fully dry after about 2 hours. The application viscosity of the approx. 70% solids lacquer was 30 seconds (as measured in a DIN 4 cup). The lacquer had the following data:

Pendulum hardness (DIN 53 157):
    after 4 h 82 seconds
    after 24 h 123 seconds
    after ageing 177 seconds
Erichesn value (DIN ISO 1520): 7 to 8 mm

EXAMPLE 11

A clear lacquer was prepared by mixing 661 parts of the 80% solution of the NCO prepolymer prepared in accordance with Example 8 with 171 parts of ketimine I and 168 parts of butylacetate/xylene (1:1). The lacquer, which had an adequate pot life of several days, dried rapidly at room temperature in a layer thickness of approx. 40 μm, was sand dry after about 50 minutes and completely dry after about 2.5 h. The lacquer film achieved surface lacquer quality and was distinguished after aging by adequate hardness, high elasticity and very good solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a prepolymer containing free tertiary isocyanate groups and having an average molecular weight of about 1000 to 3000 and an NCO content of about 4 to 12% by weight which comprises reacting at an NCO/OH equivalent ratio of 1.6:1 to 2:1

(a) an organic diisocyanate having a molecular weight of 168 to 320 and containing an isocyanate group attached to a primary carbon atom and an isocyanate group attached to a tertiary aliphatic or cycloaliphatic carbon atom, optionally in admixture with up to 25 equivalent percent, based on component (a) as a whole, of a diisocyanate containing aliphatically and/or cycloaliphatically bound isocyanate groups and having a molecular weight of 168 to 300 which does not contain any isocyanate groups attached to a tertiary carbon atom with (b) a polyol component comprising at least one polyester polyol having a molecular weight of 800 to about 12,000 and a hydroxyl functionality of 2 to 6, optionally in admixture with at least one low molecular weight, polyhydric aliphatic alcohol having a molecular weight of 62 to 799, said polyol component having an average hydroxyl functionality of 2.1 to 3.

2. The process of claim 1 wherein said organic diisocyanate corresponds to the formula

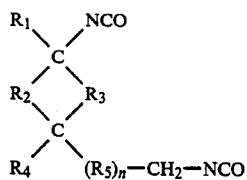

in which
R$_1$ is a C$_1$–C$_4$ alkyl group,
R$_2$ and R$_3$, which may be the same or different, represent a linear or branched, difunctional saturated C$_1$–C$_4$ hydrocarbon radical,
R$_4$ is hydrogen or a C$_1$–C$_4$ alkyl group,
R$_5$ is a linear or branched, saturated difunctional C$_1$–C$_4$ hydrocarbon radical and
n is 0 or 1.

3. The process of claim 1 wherein component (a) comprises 1-isocyanato-1-methyl-4(3)-isocyanatomethylcyclohexane.

4. The process of claim 1 wherein component (a) comprises 1-isocyanato-1-methyl-4(4-isocyanatobut-2-yl)-cyclohexane.

5. The process of claim 1 wherein component (a) comprises 1-isocyanato-1,2,2-trimethyl-3-(2-isocyanatoethyl)-cyclopentane.

6. The process of claim 1 wherein said polyol component comprises at least one polyester polyol having a molecular weight of about 1000 to 3000 and a hydroxyl functionality of 2 to 4, optionay in admixture with at least one polyhydric aliphatic alcohol having a molecular weight of 62 to 200 and a hydroxyl functionality of from 2 to 4.

7. The process of claim 3 wherein said polyol component comprises at least one polyester polyol having a molecular weight of about 1000 to 3000 and a hydroxyl functionality of 2 to 4, optionally in admixture with at least one polyhydric aliphatic alcohol 1 having a molecular weight of 62 to 200 and a hydroxyl functionality of from 2 to 4.

8. A prepolymer containing free tertiary isocyanate groups and having an average molecular weight of about 1000 to 3000 and an NCO content of about 4 to 12% by weight which is prepared by a process which comprises reacting at an NCO/OH equivalent ratio of 1.6:1 to 2:1
(a) an organic diisocyanate having a molecular weight of 168 to 320 and containing an isocyanate group attached to a primary carbon atom and an isocyanate group attached to a tertiary aliphatic or cycloaliphatic carbon atom, optionally in admixture with up to 25 equivalent percent, based on component (a) as a whole, of a diisocyanate containing aliphatically and/or cycloaliphatically bound isocyanate groups and having a molecular weight of 168 to 300 which does not contain any isocyanate groups attached to a tertiary carbon atom with (b) a polyol component comprising at least one polyester polyol having a molecular weight of 800 to about 12,000 and a hydroxyl functionality of 2 to 6, optionally in admixture with at least one low molecular weight, polyhydric aliphatic alcohol having a molecular weight of 62 to 799, said polyol component having an average hydroxyl functionality of 2.1 to 3.

9. The prepolymer of claim 8 wherein said organic diisocyanate corresponds to the formula

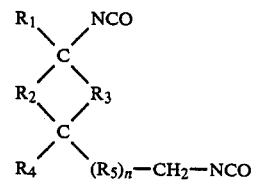

in which
R$_1$ is a C$_1$–C$_4$ alkyl group,
R$_2$ and R$_3$, which may be the same or different, represent a linear or branched, difunctional saturated C$_1$–C$_4$ hydrocarbon radical,
R$_4$ is hydrogen or a C$_1$–C$_4$ alkyl group,
R$_5$ is a linear or branched, saturated difunctional C$_1$–C$_4$ hydrocarbon radical and
n is 0 or 1.

10. The prepolymer of claim 8 wherein component (a) comprises 1-isocyanato-1-methyl-4-(3)-isocyanatomethylcyclohexane.

11. The prepolymer of claim 8 wherein component (a) comprises 1-isocyanato-1-methyl-4-(4-isocyanatobut-2-yl)-cyclohexane.

12. The prepolymer of claim 8 wherein component (a) comprises 1-isocyanato-1,2,2-trimethyl-3-(2-isocyanatoethyl)-cyclopentane.

13. The prepolymer of claim 8 wherein said polyol component comprises at least one polyester polyol having a molecular weight of about 1000 to 3000 and a hydroxyl functionality of 2 to 4, optionaly in admixture with at least one polyhydric aliphatic alcohol having a molecular weight of 62 to 200 and a hydroxyl functionality of from 2 to 4.

14. The prepolymer of claim 10 wherein said polyol component comprises at least one polyester polyol having a molecular weight of about 1000 to 3000 and a hydroxyl functionality of 2 to 4, optionally in admixture with at least one polyhydric aliphatic alcohol having a molecular weight of 62 to 200 and a hydroxyl functionality of from 2 to 4.

15. A polyurethane lacquer or coating prepared from the prepolymer of claim 8 and an isocyanate reactive compound.

16. The polyurethane lacquer or coating of claim 15 wherein said isocyanate-reactive compound comprises a ketimine based on a polyamine containing aliphatically and/or cycloaliphatically bound primary amino groups and an aliphatic and/or cycloaliphatic ketone.

* * * * *